Oct. 3, 1972 — L. L. WINOKUR — 3,695,901
COHERENT STICK OF SHIRRED TUBING
Filed May 7, 1970 — 3 Sheets-Sheet 3

INVENTOR
LOUIS L. WINOKUR
BY
ATTORNEY

United States Patent Office 3,695,901
Patented Oct. 3, 1972

3,695,901
COHERENT STICK OF SHIRRED TUBING
Louis L. Winokur, 741 Brummel St.,
Evanston, Ill. 60202
Filed May 7, 1970, Ser. No. 35,443
Int. Cl. A22c 13/00
U.S. Cl. 99—176
8 Claims

ABSTRACT OF THE DISCLOSURE

A shirred stick of flexible tubing having a straight bore and an ordered pattern of shirred pleats has an improved coherency and is provided with one or more longitudinal grooves formed and extending on its outer surface from one end of the stick to the other. The grooves are formed by passing the shirred tubing through a restraining device comprising one or more blades disposed about a shirring mandrel to engage and longitudinally indent the outer surface of the shirred tubing.

---

This invention relates to new improvements in the art of shirring artificial sausage casings, such as casings made of regenerated cellulose, cellulose derivatives, collagen, alginates, or microporous plastic film, for example.

Artificial sausage casings are produced in the form of flexible, thin-walled tubings of very great length varying from 32 to 160 feet or more. For convenience in handling, these tubings are shirred and compressed into sticks (as they are commonly termed in the art) of from about 6 to 25 inches in length. The sticks are thereafter placed on a stuffing horn, filled with meat emulsion, linked and processed as is well known in the sausage art. The stuffing and linking operations are now in most cases entirely automatic and, therefore, they require a great uniformity of the sticks. The pleats formed during the shirring and compressing steps must be very regular to produce a straight, coherent, cylindrical envelope having a uniform bore from one end to the other, and to unfold regularly and smoothly under the pressure of the meat emulsion.

The conversion of continuous flexible tubing into a succession of shirred sticks of predetermined lengths suitable for sausage casings involves a series of steps that have attained a recognized status in the art. In a well known method, these steps include: supplying metered quantities from a continuous supply of tubing to a mandrel in a shirring zone; inflating the tubing and shirring, or pleating, the inflated tubing on the mandrel in the shirring zone; severing a predetermined shirred length from the unshirred tubing supply or from a subsequent shirred length; transferring by advancing along the mandrel the shirred tubing length to a compressing station and there compressing it in one or more steps into a durable self-sustaining article (commonly called a "stick") of predetermined internal diameter; and doffing the compressed stick from the compression station to a packing station.

The requirements of the newest automatic, high speed sausage stuffing and linking machines are of such precision that they will only accept compressed sticks having a perfectly straight, large bore, and a high degree of coherency coupled with the most regular pleat pattern. Thus, these new machines have made it necessary to further improve the shirred sticks.

It is an object of this invention to provide a new, self-sustaining stick having a uniform pleat pattern, an improved pleat compaction and the high degree of coherency required by the newest automatic machines.

Another object of this invention is to provide an improved method and apparatus for shirring and compacting a flexible tubing wherein an ordered shirred pattern of pleats is formed with a longitudinal groove on the outer surface of the pleats, which upon compression of the shirred tubing, produces a stick having an improved coherency.

The invention will be described with reference to the accompanying drawing wherein.

The invention comprises a coherent, self-sustaining stick of shirred and compressed flexible tubing having a straight bore, a substantially cylindrical outer surface and an ordered pattern of shirred pleats which are compressed, and formed on the outer surface of the stick are one or more grooves extending longitudinally from one end of the stick to the other.

The invention also includes a method for producing the coherent, self-sustaining stick. The method comprises advancing a flexible tubing over a mandrel and inflating and shirring the advancing tubing. The shirred tubing is advanced from the shirring zone and subjected to a restraining pressure narrowly and longitudinally applied onto its outer surface to lineally indent the outer surface of the pleats and form a longitudinal groove in the tubing. This narrow, longitudinal restraining pressure results in better compaction of the shirred tubing and also in a more regular pleat formation. The shirred, compacted tubing may thereafter be severed and axially compressed on the mandrel in one or more steps into a stick having one or more grooves longitudinally extending from one end of the stick to the other.

The invention further comprises an apparatus for producing the coherent, self-sustaining stick. The apparatus includes a restraining device comprising one or more blades disposed about a shirring mandrel to engage and longitudinally indent the outer surface of the shirred tubing and to form one or more longitudinal grooves therein.

The expression "groove," or "grooves," used herein and in the appended claims refers to a shallow, narrow, depression extending along a continuous line from one end of the stick to the other. The groove can be of varying depth, from very shallow such as a merely flattened zone, to as deep as to form an indentation in the outer surface of the shirred stick.

The member forming the groove in the shirred tubing may take the form of a continuous member like a tongue or of a plurality of spaced-apart members like fingers or pins. For conciseness in referring to this member, the term "blade" will be used herein and in the appended claims with the understanding that it will refer to any of the above forms or their mechanical equivalents.

Figure 1:
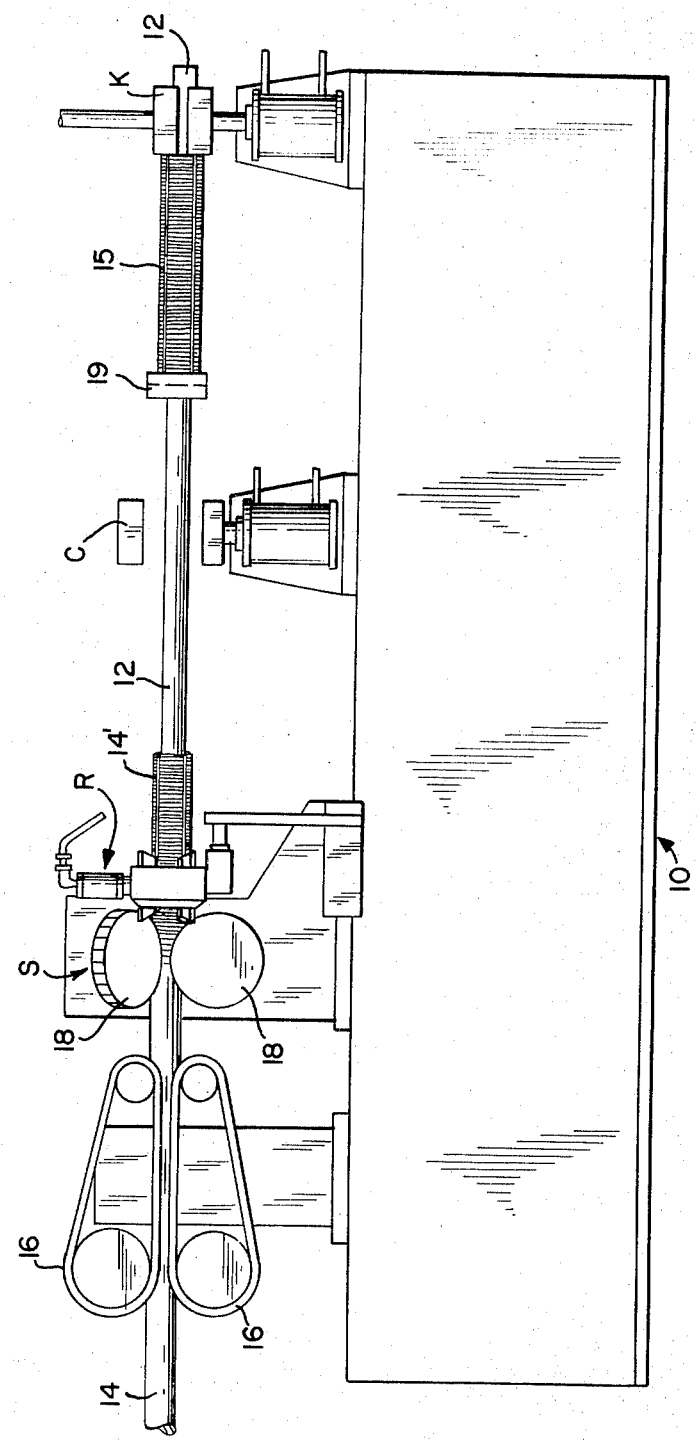
FIG. 1 is a diagrammatic side elevation of a shirring apparatus showing an embodiment of the invention.

Referring to the drawing, there is shown in FIG. 1 a shirring apparatus generally designated as 10. The apparatus 10 comprises a shirring mandrel 12 extending through a shirring head S. An inflated tubing 14 is fed onto the mandrel 12 by a pair of feed belts 16. The shirring head S comprises a plurality of shirring wheels 18 through which the inflated tubing passes and which shirr the tubing in a manner well known to those skilled in the art.

The restraining device of the invention, generally indicated as R, is positioned about the mandrel 12 adjacent the exit of the shirring passage formed by the shirring wheels 18, to longitudinally engage, indent and compact the shirred tubing 14' and to form grooves therein, as will later be described in detail. The compacted and indented shirred tubing may thereafter be successively compressed by a compressor means 19 against a first clamp C and against a second clamp K in conventional manner and doffed from the shirring mandrel to be packed and shipped to the sausage manufacturers.

Figure 2:
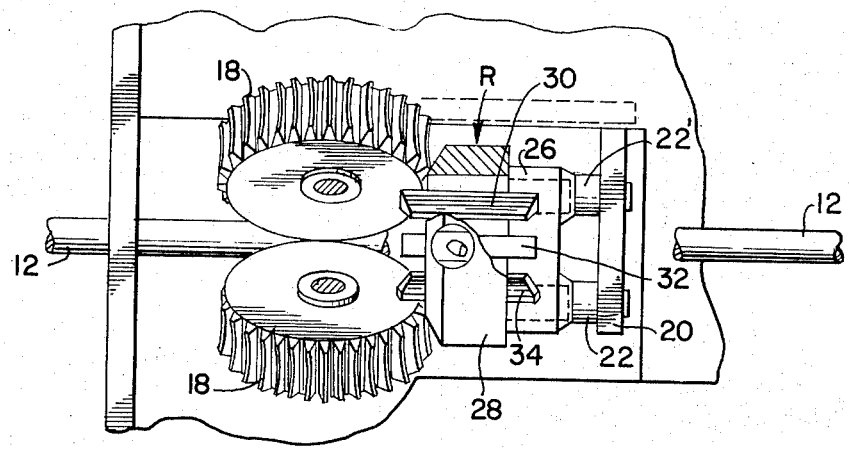
FIG. 2 is a plan view of a portion of the apparatus of FIG. 1 with parts broken away showing means for shirring a tubing and an embodiment of the means for forming a longitudinal groove in a shirred tubing according to the invention.
Figure 3:
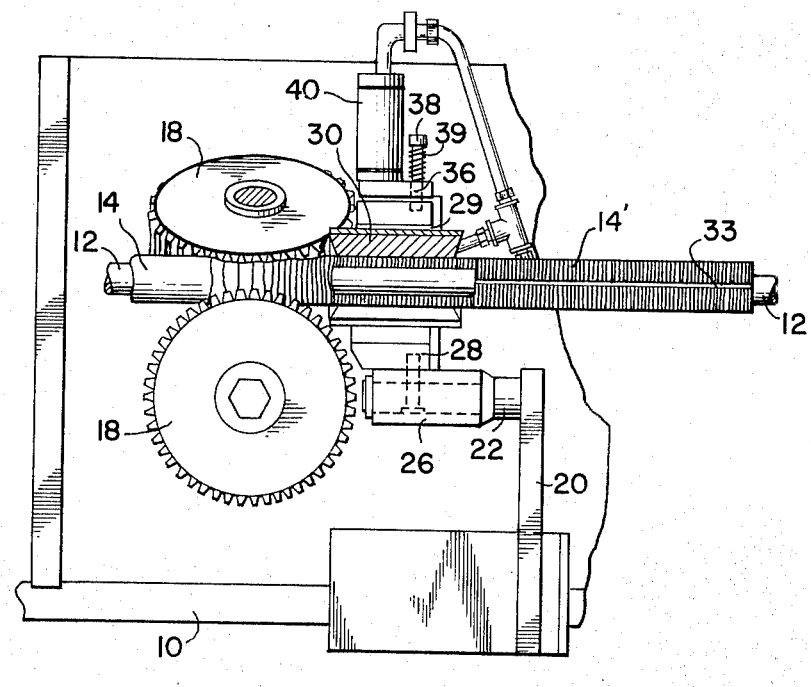
FIG. 3 is a side elevation view partially in section of a portion of the apparatus of FIG. 1 showing the means of FIG. 2 for forming the groove.
Figure 4:
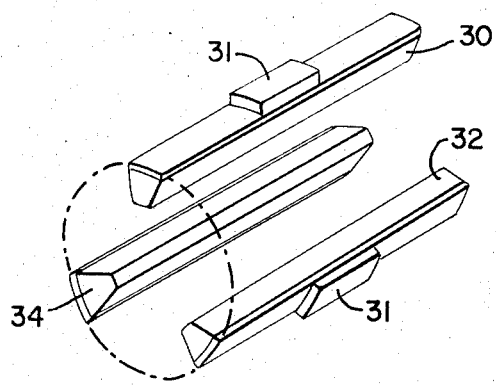
FIG. 4 is an enlarged detail elevation of the embodiment of the means for forming longitudinal grooves in the shirred tubing shown in FIGS. 1 to 3.

A preferred embodiment of the restraining device of the invention is illustrated in FIGS. 2 to 4. The restraining device R is mounted to the frame of the apparatus 10 by an angle bracket 20. Adjacent the upper end of this bracket 20 is horizontally secured a pair of mounting rods 22, 22' cantilevered from the bracket 20 toward the shirring passage, and spaced equidistant about the vertical center line of the mandrel 12. The mounting rods 22, 22' are secured into a carriage block 26, on the top surface of which is horizontally fastened a housing 28 for the restraining device of the invention centered on the mandrel 12. The housing 28 has equiangularly spaced channels or rabbets 29 longitudinally aligned with the mandrel 12, the rabbets being disposed on the inner surface of the housing 28 at the 2 o'clock, 4 o'clock and 8 o'clock axes.

In the embodiment illustrated in FIGS. 2 to 4, the restraining device comprises three straight, solid blades 30, 32 and 34 disposed concentrically about and longitudinally extending to the mandrel 12 and at an adjustable distance from the mandrel. This distance is preset according to the size of the shirred tubing and the desired depth of the indentation to be produced in the shirred tubing by the blades. As more clearly shown in FIG. 4, the blades 30, 32 and 34 are shaped somewhat like tongues with, preferably, a flat tubing-indenting surface, which may also be rounded. The tubing indenting surface of the blades may be made of metal, such as steel, or of hard nylon, or rubber or plastic or of any material capable of indenting the casing without damaging it. The blades 30, 32 and 34 are disposed in equal spaced apart relationship with respect to each other. They extend parallel to the longitudinal axis of the mandrel 12. Each blade is mounted on a back up plate 31, each plate being machined for a slide fit in the rabbets 29.

With reference to FIG. 3, the plates 31 are slideably fastened into the rabbets 29 of the housing 28 by an end thrust plate 36. Cap screws 38, fastened to the back up plates 31, resiliently urge the plates outwardly from the mandrel 12 by means of compression springs 39. Three single acting air cylinders 40 are radially fastened in the housing 28 centered on the rabbets 29, respectively, with their piston rods arranged to abut the inner surface of the rabbets 29. The air cylinders are commonly actuated by conventional means (not shown). When pressurized, such as to about 35 to 50 pounds per square inch pressure to provide about 15 to 22 pounds of force, the pistons of the air cylinders 40 engage the top surface of the back up plates 31 to urge the blades towards the mandrel 12, whereby the shirred tubing 14' advancing on the mandrel 12 is longitudinally engaged by the blades 30, 32 and 34. The blades longitudinally apply a restraining pressure onto the outer surface of the advancing tubing and simultaneously indent the tubing along three, parallel, straight lines. The blades force the shirred casing into a regular, straight, interlocked pleat structure with three straight parallel grooves 33 therein. The distance between the blades and the shirring wheels is not critical. It is preferable, however, to position the blades as conveniently close to the shirring wheels as possible, since the restraining force exerted by the blades cooperates with the shirring force exerted by the wheels upon the tubing to form a uniform, coherent pleat pattern.

Figure 5:
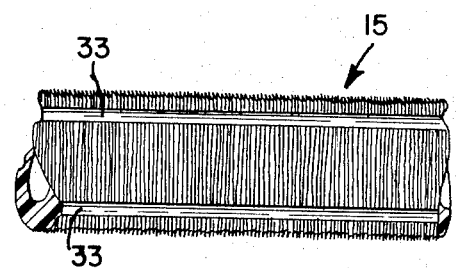
FIG. 5 is a plan view of a shirred stick having grooves therein produced by the means shown in FIG. 4.

The indented, compacted tubing is thereafter severed and compressed into a coherent, self-sustaining stick 15 having three parallel grooves 33 extending from one end of the stick to the other, as shown in FIG. 5.

The depth and width of the grooves may be varied by using blades of various thicknesses and/or by varying the pressure. For example, the larger the tubing-indenting surface, the shallower the groove, and the thinner the tubing-indenting surface the deeper the groove, at the same air cylinder pressure.

Figure 6:
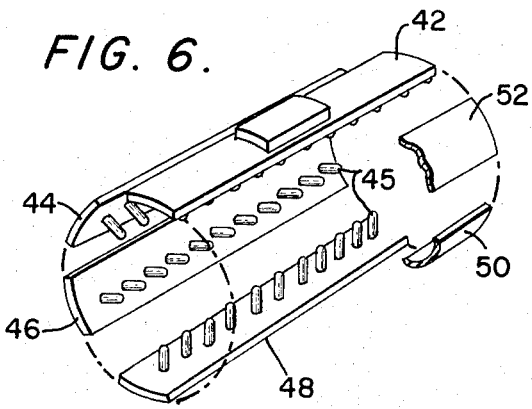
FIG. 6 is a detail elevation of another embodiment of means for forming longitudinal grooves in a shirred tubing according to the invention.
Figure 7:
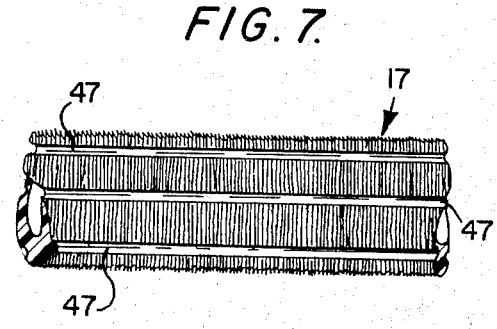
FIG. 7 is a plan view of a shirred stick having grooves therein produced by the means shown in FIG. 6.

Another embodiment of the means for making grooves in a shirred tubing according to the invention is shown in FIG. 6. Instead of being shaped like tongues with a solid indenting surface, the blades 42, 44, 46, 48, 50 and 52 are each provided with a substantially straight row of upstanding spaced apart fingers 45 having a smooth, spherical extremity. The rows of fingers 45 form the tubing-indenting surface of the blades. The fingers 45 may be either rigid or flexible, according to the kind of tubing being shirred. The fingers 45 longitudinally engage, restrain and indent the shirred tubing 14' along six lines parallel to the longitudinal axis of the mandrel and of the tubing. The final compressed stick 17 shown in FIG. 7 has six straight grooves 47 formed in the pleats indented by the fingers.

In a further modification of the tubing-indenting means of the invention, the blades may be skewed instead of extending longitudinally of the mandrel. In this case, the skewed blades will engage, restrain and lineally indent the shirred tubing along lines at an angle with respect to the longitudinal axis of the tubing and of the mandrel and the shirred tubing is twisted about the mandrel while parallel grooves are formed in the outer surface of the pleats. These grooves extend helically from one end of the final stick to the other. When blades having a straight tubing-indenting surface as shown in FIG. 4, for example, are skewed, the angle of contact with the shirred tubing is small. It will be obvious to those skilled in the art that this angle of contact may be increased by providing the straight blades with an arcuate tubing-indenting surface. In case of non-uniform tubing, it is desirable to use skewed blades to simultaneously twist and indent the shirred tubing because the twisting motion tends to distribute the shirred pleats equally around the circumference of the stick as it is formed, while the grooves increase the coherency of the stick.

While the restraining device of the invention has been described above with three or six blades, it should be well understood that the invention is not limited thereto. There could be more or fewer blades.

The advantage of using the restraining device of the invention will be illustrated in the following example.

EXAMPLE

A shirring machine having a shirring head with three shirring wheels as described in U.S. Pat. No. 2,983,949 was provided with a restraining device of the invention as shown in FIGS. 1 to 4. A cellulose tubing having 0.84 inch inflated diameter was shirred at a rate of about 700 feet of tubing per minute. The restraining device had the following dimensions:

Length of each blade—1¾ inches
Radius of the inner surface of the blade—³¹⁄₆₄ inch
Width of the tubing-indenting surface of the blade—⁷⁄₃₂ inch
Diameter of the mandrel:
    In shirring passage—0.620 inch
    In restraining device—0.580 inch
Force applied to each blade—4 to 12 lbs.

Eighty-four foot lengths of the inflated tubing were shirred, passed through the restraining device, indented and compressed into sticks about 14 inches long. Each stick had on its outer surface three, straight, parallel grooves about 7/32 inch wide and about 1/16 inch deep.

The sticks were tested and found to be of a cylindrical straightness such that they would roll from rest under their own weight down a flat metal plate sloped at an angle of 25 degrees to the horizontal. Routine testing of casing sticks made by the instant invention demonstrated that consistent coherency of the sticks (resistance to disjoining or breaking) when tested by the following coherency test method was within a range of 4.0 to 5.0 inch-lbs. force.

Sticks that were shirred and compressed by the same machine but without a restraining device according to the invention had a coherency of from 1.8 to 2.5 inch-lbs. force.

Coherency test method

Coherency of a casing stick is determined by measuring the force required to break a 2¼ inch unsupported extension of the shirred stick on a polished steel rod of 7/16 inch diameter which is cantilevered to a wooden test stand. The test stick is cut at a point 2 inches from its fore end and the short length discarded. The longer section is then deshirred 2½ inches at the cut end, and a 3 inch length of ¾ inch wide pressure-sensitive tape (Permacel No. 10004) is applied over the 2½ inch deshirred tab and the last ½ inch of shirred stick. Then the taped stick is positioned on the steel rod against a reference marker which allows a 2¼ inch extension of the casing stick to project beyond the rod end. A force gauge (such as Hunter Force Indicator, Model L-IM with a "Hold at Maximum Device") is fastened to the tape-supported tab by means of a spring loaded jaw, and the tab is slowly pulled down until the stick breaks. The force reading is noted and the actual length of the broken section is measured to the nearest 0.1 inch. The product of the force in pounds multiplied by the length in inches is reported as coherency in inch-pounds of force.

What is claimed is:

1. A coherent self-sustaining stick of shirred and compressed tubular sausage casing having a straight uniform bore of predetermined internal diameter, a substantially cylindrical outer surface and an ordered pattern of shirred, compressed pleats, and, formed on the outer surface of the compressed pleats, at least one groove longitudinally extending from one end of the stick to the other.

2. A stick as claimed in claim 1, in which on the outer surface of the compressed pleats are formed a plurality of grooves.

3. A stick as claimed in claim 2, in which the grooves are equally spaced apart from each other.

4. A stick as claimed in claim 1, in which the grooves extend in a substantially straight line from one end of the stick to the other.

5. A stick as claimed in claim 1, in which the grooves extend helically from one end of the stick to the other.

6. A method of producing a coherent, self-sustaining stick of shirred and compressed flexible sausage casing tubing, which method comprises
- advancing an inflated flexible tubing over a mandrel;
- shirring the advancing tubing;
- subjecting the shirred, advancing tubing to a lineal restraining pressure longitudinally applied onto the outer surface of said shirred tubing, while lineally indenting said outer surface to form a longitudinal groove therein;
- severing and compressing the resulting length of lineally indented, shirred tubing into a coherent, self-sustaining stick.

7. A method as claimed in claim 6, in which the outer surface of the shirred tubing is indented along a line parallel to the longitudinal axis of the tubing.

8. A method as claimed in claim 6 in which the outer surface of the shirred tubing is indented along a line at an angle to the longitudinal axis of the tubing.

References Cited

UNITED STATES PATENTS

| | | | |
|---|---|---|---|
| 456,661 | 7/1891 | Shearer | 138—156 X |
| 2,556,187 | 6/1951 | Ingalls | 138—122 X |
| 2,576,835 | 11/1951 | Hewitt | 138—122 X |
| 3,397,069 | 8/1968 | Urbutis | 99—175 X |
| 3,412,628 | 11/1968 | De Gain | 138—121 X |
| 3,454,981 | 7/1969 | Martinek | 99—176 X |
| 3,461,484 | 8/1969 | Arnold | 99—176 |
| 2,867,242 | 1/1959 | Harris | 138—121 X |

FOREIGN PATENTS

| | | | |
|---|---|---|---|
| 21,188 | 4/1961 | Germany | 138—121 |
| 828,983 | 3/1938 | France | 138—122 |

FRANK W. LUTTER, Primary Examiner

R. HALPER, Assistant Examiner

U.S. Cl. X.R.

17—42